Dec. 11, 1951  C. R. JOHNSTON  2,578,189
HARVESTER FOR POTATOES AND THE LIKE
Filed June 29, 1945  5 Sheets-Sheet 1
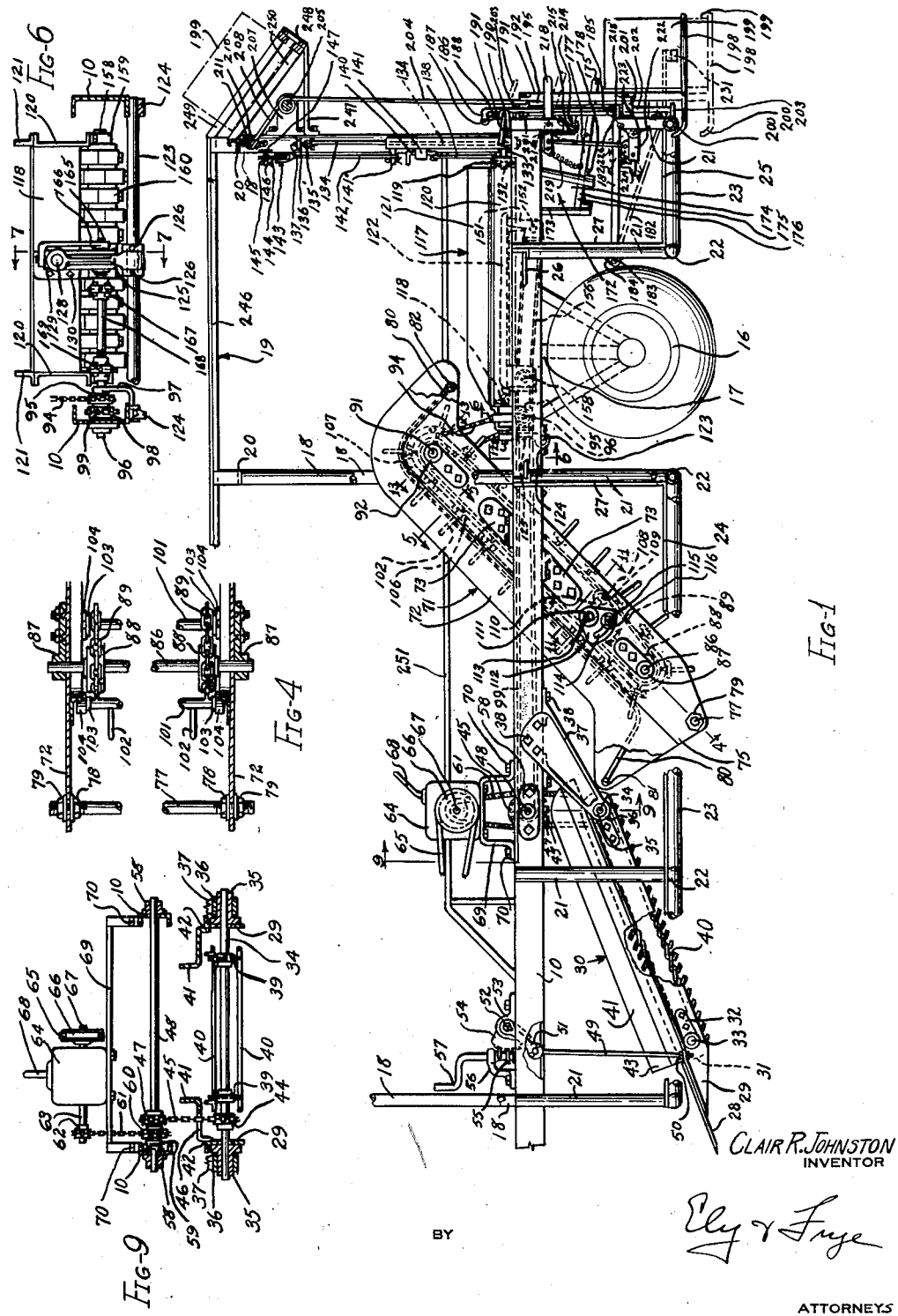
CLAIR R. JOHNSTON
INVENTOR
BY Ely & Frye
ATTORNEYS Dec. 11, 1951     C. R. JOHNSTON     2,578,189
HARVESTER FOR POTATOES AND THE LIKE
Filed June 29, 1945     5 Sheets-Sheet 2
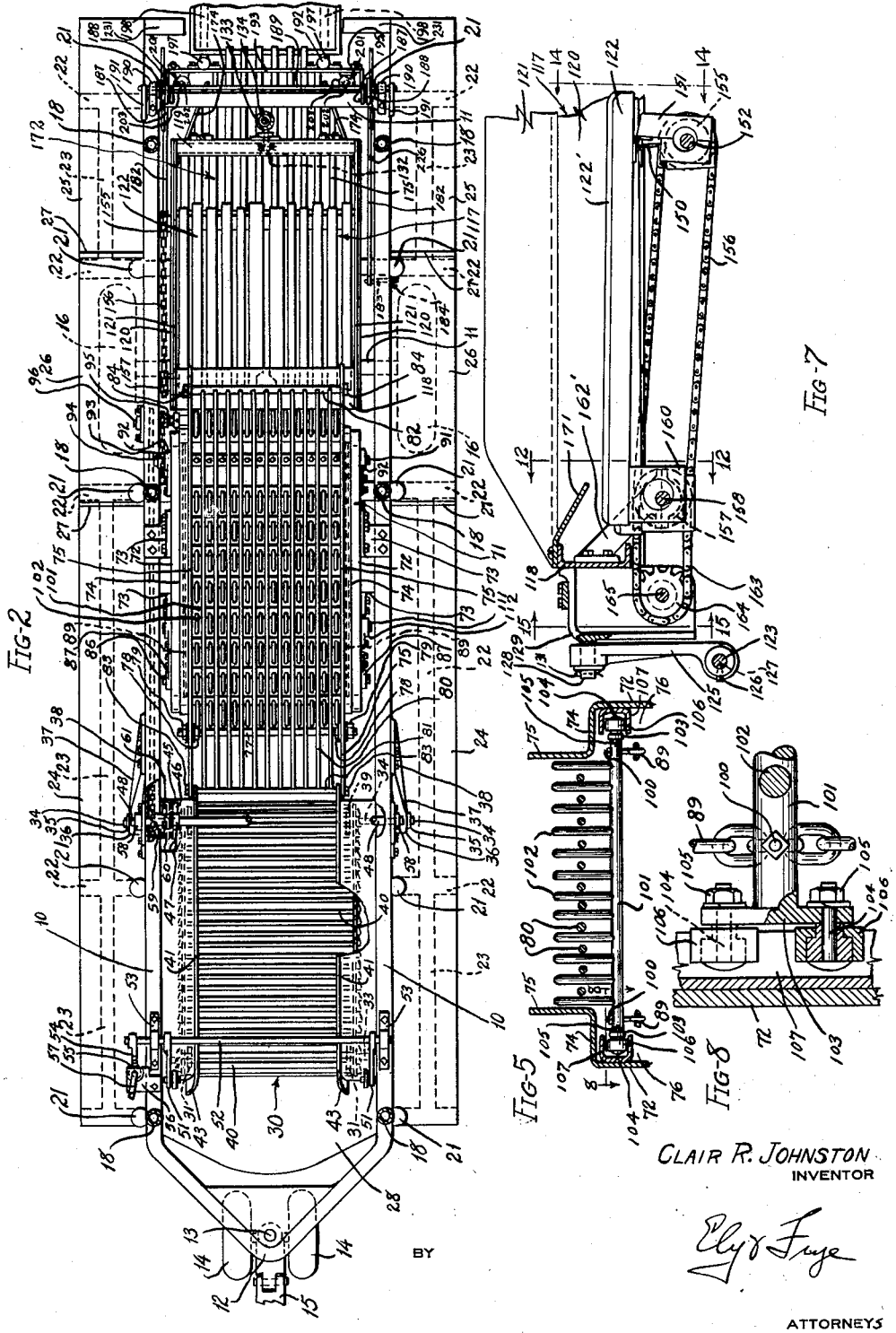
CLAIR R. JOHNSTON
INVENTOR
ATTORNEYS

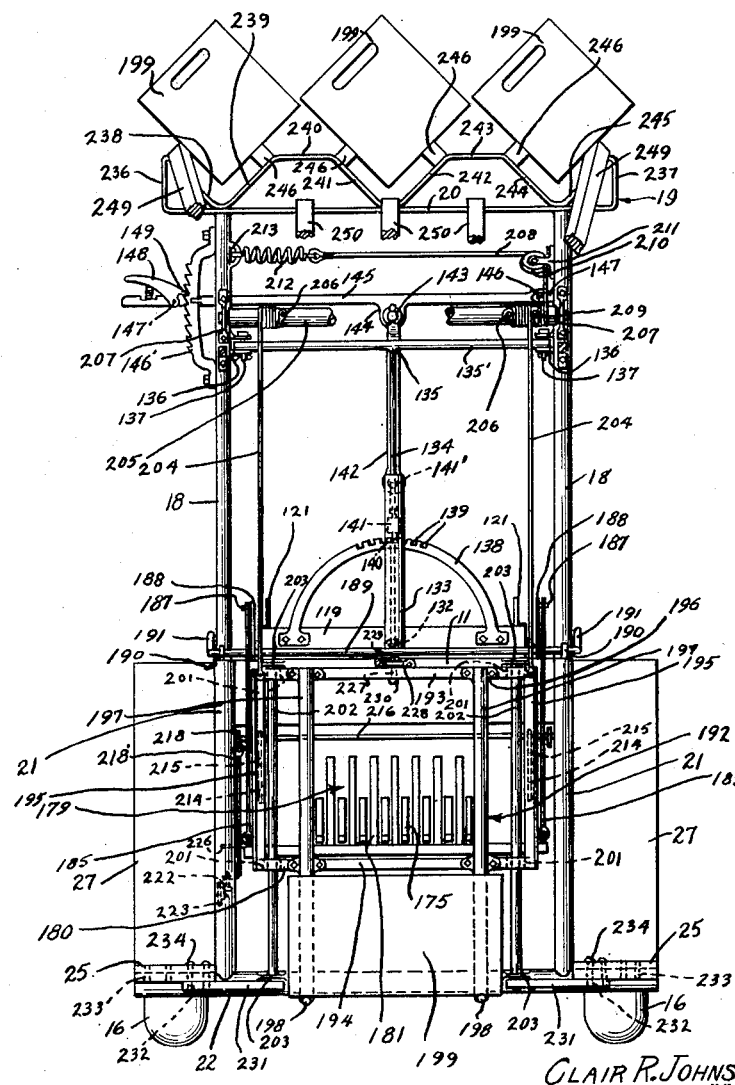

Dec. 11, 1951     C. R. JOHNSTON     2,578,189
HARVESTER FOR POTATOES AND THE LIKE
Filed June 29, 1945     5 Sheets—Sheet 4
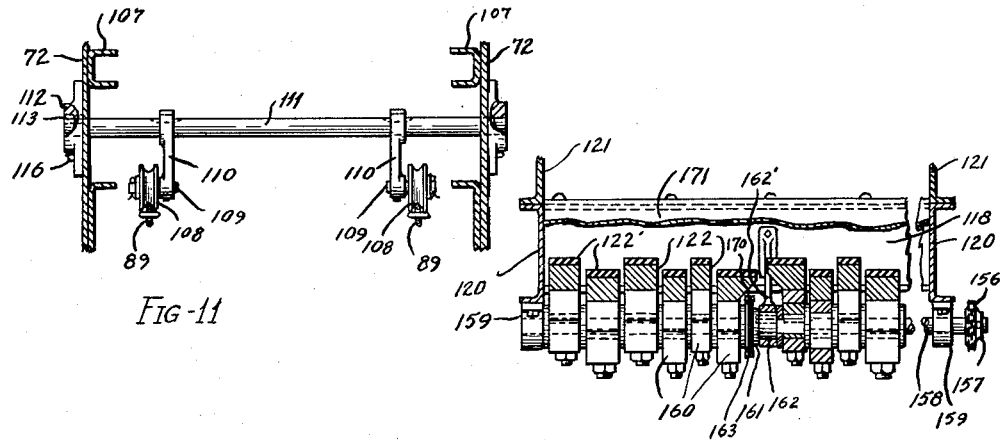
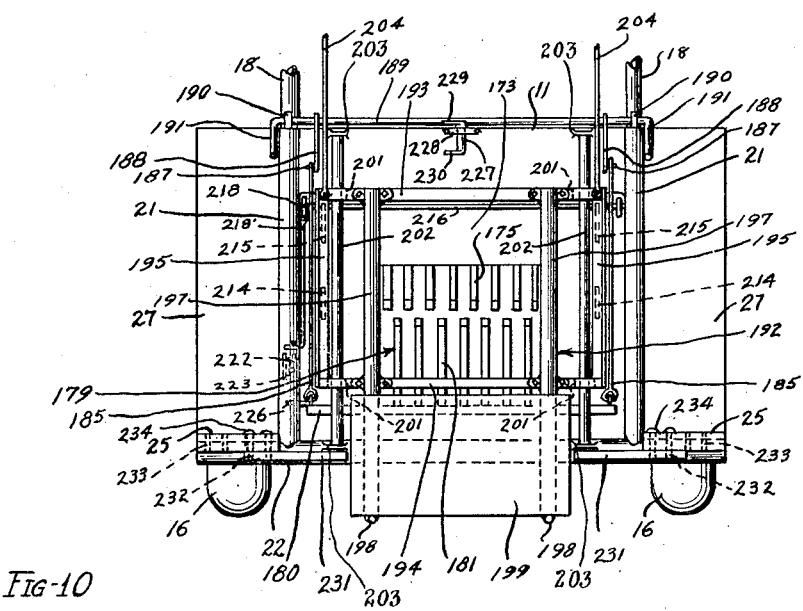
CLAIR R. JOHNSTON
INVENTOR
ATTORNEYS Dec. 11, 1951 C. R. JOHNSTON 2,578,189
HARVESTER FOR POTATOES AND THE LIKE
Filed June 29, 1945 5 Sheets-Sheet 5
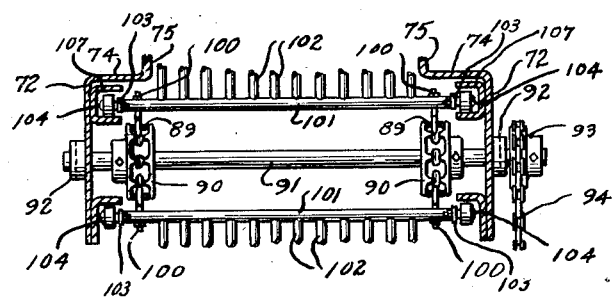
CLAIR R. JOHNSTON
INVENTOR
ATTORNEYS Patented Dec. 11, 1951

2,578,189

UNITED STATES PATENT OFFICE 2,578,189

HARVESTER FOR POTATOES AND THE LIKE

Clair R. Johnston, Akron, Ohio

Application June 29, 1945, Serial No. 602,217

15 Claims. (Cl. 55—51)

This invention relates to improvements in apparatus for harvesting potatoes and other buried crops, wherein the crops are first removed from the ground, then separated from the dirt and stones, then crated, and finally the filled crates are dropped from the apparatus.

An object of the invention is to provide an apparatus of this type which is mounted on a vehicle and adapted to be drawn by a tractor or other suitable power unit, said apparatus including a combined shovel or scoop unit and small, inclined power driven conveyor, adjustable so as to dig into the ground and deliver the crops, stones, dirt, etc., to a larger, inclined power driven conveyor, the arrangement being such that much of the dirt and foreign matter is separated from the crops during its travel over the two conveyors, but the larger stones and all of the crops except the very small ones are delivered by the larger conveyor to a horizontal shaker table which shakes any remaining dirt from the crops and stones so that an operator may readily pick out and discard the stones, leaving the crops to pass into a hopper from which they are delivered through a movable gate to a crate.

Another object is to provide a source of power, such as an internal combustion engine or the like, from which the conveyors and the shaker table may be positively operated whether or not the vehicle carrying the apparatus is in motion, and to provide a novel drive for the conveyors and shaker table.

A further object is to provide a conveyor consisting of a series of spaced, parallel, longitudinally arranged bars, between which project a plurality of moving fingers which carry to the top of the conveyor all material which is too large to fall through the bars.

A further object is to provide a shaker table consisting of a plurality of vertically reciprocating parallel shaker bars operated by crank mechanism, with the throw of the crank shaft at the front of the table being twice as great as at the rear so that the crops will be moved to the rear of the table as they are vigorously shaken to remove the dirt therefrom and to separate them from the stones.

A further object is to provide a shaker table of the character referred to which may be tilted to either side on its longitudinal axis whereby the table may be kept substantially level when the vehicle is operating on the side of a hill.

A further object is to provide means for raising and lowering the rear end of the shaker table so as to maintain the table substantially level when the vehicle is operating up or down hill.

A further object is to provide a gate for the hopper through which the crops will pass to a crate, which gate is quickly opened and closed and positive in its action so as not to permit clogging of the gate by the crops.

A further object is to provide a crate carrying member including a pair of horizontal rearwardly extending, crate carrying rods, which may be raised into position so the crate can receive the crops and then lowered so the filled crate can be easily dropped from the vehicle while the latter is in motion.

A further object is to provide a crate carrying member that may be automatically lowered by the closing action of the gate, and manually lowered at any time there is sufficient weight thereon.

A further object is to provide a supporting frame on top of the vehicle to carry a large number of empty crates, and to provide a downwardly inclined cage portion at the rear of the frame so the empty crates may be quickly slid into a position from which they may be readily removed for placement on the movable crate carrying member.

A further object is to provide horizontal running boards, fenders and hand rails on both sides of the vehicle adjacent the conveyors and shaker table so that operators may ride in a position to readily remove stones and other foreign objects from the conveyors and the table before the crops reach the rear end of the table.

Other objects and advantages will become apparent from the following description taken in conjunction with the accompanying drawings.

In the drawings:

Fig. 1 is a side elevation of the apparatus with parts broken away for clearness of illustration, Fig. 2 is a plan view of the apparatus with the crate carrying frame removed from the top thereof for clearness of illustration, Fig. 3 is a rear elevation of the apparatus with parts broken away for clearness of illustration, and showing the gate in closed position, Fig. 4 is an enlarged section taken substantially on line 4—4 of Fig. 1, Fig. 5 is an enlarged section taken substantially on line 5—5 of Fig. 1, Fig. 6 is an enlarged section taken substantially on line 6—6 of Fig. 1, Fig. 7 is an enlarged section taken substantially on line 7—7 of Fig. 6, Fig. 8 is an enlarged section taken substantially on line 8—8 of Fig. 5, Fig. 9 is an enlarged section taken substantially on line 9—9 of Fig. 1, Fig. 10 is a view similar to the lower half of Fig. 3, showing the gate in open position, Fig. 11 is an enlarged section taken substantially on line 11—11 of Fig. 1, Fig. 12 is an enlarged section taken substantially on line 12—12 of Fig. 7, Fig. 13 is an enlarged section taken substantially on line 13—13 of Fig. 1, Fig. 14 is an enlarged view partly in section looking in the direction of the arrows substantially on line 14—14 of Fig. 7, Fig. 15 is an enlarged section taken substantially on line 15—15 of Fig. 7, and Fig. 16 is an enlarged fragmentary view of a portion of the rear of the apparatus.

Referring to the drawings the numeral 10 designates a pair of spaced, longitudinal side frame members of the vehicle, preferably of channel shape in cross section, and a plurality of transverse frame members 11 are suitably connected to the members 10. The front ends of members 10 converge inwardly as at 12 (Fig. 2) and support a pivotal mounting 13 for a pair of small front traction wheels 14 which are adapted to be connected by the pivoted bar 15 to a traction unit, such as a tractor or the like (not shown). Rear wheels 16 are suitably mounted on brackets 17 extending downwardly from the frame members 10 and 11.

At spaced intervals the frame members 10 have secured thereto upwardly extending posts 18, which in this instance are tubular in cross-section, and which support a crate carrying frame, indicated as a whole by the numeral 19. It will be understood that frame 19 extends the length of the vehicle, but is shown broken away for the sake of clearness. Posts 18 may be welded or otherwise suitably secured to frame members 10, and below their upper ends, so as not to interfere with crates in the frame 19, these posts are connected by transverse members 20.

Posts 21, similar to posts 18, having their upper ends welded or otherwise secured to frame members 10, extend downwardly to within several inches of the ground, and at their lower ends are connected by transverse members 22, which extend beyond the side frame members, as indicated in Fig. 2. Inwardly of their ends, members 22 are connected by longitudinal members 23, except in the area occupied by the rear wheels 16, the arrangement being such that relatively long running boards 24 are supported on members 22 and 23 from near the front of the vehicle to points adjacent the rear wheels, while short running boards 25 are supported near the rear of the vehicle. Above the rear wheels 16, horizontal boards 26 are supported on adjacent posts 21 and are connected to the running boards 24 and 25 by vertical boards 27. This arrangement provides ample fender protection around the rear wheels and permits the upper surface of boards 26 to be used as shelves for carrying crates or other articles.

All of the frame members, posts and connecting members, except the upper frame 19, are preferably formed of metal, and when welded or otherwise suitably connected at the joints, a rigid frame construction is provided on the vehicle to support the operating parts of the harvester, which will now be described.

At the front end of the vehicle, a shovel or scoop 28 is formed integral with or attached to the outer side walls 29 of a small conveyor unit, indicated as a whole by the numeral 30, having a roller 31 mounted between these walls and secured thereto by bearing brackets 32 (Fig. 1) which rotatably receive the small shafts 33 on the ends of the roller. Unit 30 has an upper shaft 34 journaled in bearing brackets 35 (see Figs. 1 and 9) secured to side walls 29 and which are lengthened to receive the bearings 36 formed in the lower ends of a pair of rearwardly inclined supporting brackets 37 which are secured to frame members 10 by means of bolts 38 or the like. This arrangement permits the unit 30 to pivot in the bearings 36 when the front end of the unit is raised or lowered, and any thrust from the digging action of the scoop is absorbed by the brackets 37 so as not to damage the shaft 34.

Shaft 34 has secured thereto a pair of spaced sprockets 39 (Fig. 9) which receive and drive a single endless chain of transversely disposed rods 40 of conventional construction which pass over roller 31 and convey crops, dirt, stones, etc., to the top of the unit 30. For further details concerning this endless chain and drive arrangement attention is directed to Patent No. 2,172,435. A pair of inner side walls 41, which may be called guide walls for the crops, are welded or otherwise secured to the walls 29, as indicated at 42 (Fig. 9), and the lower ends of walls 41 are flared outwardly as at 43 (Fig. 2). Shaft 34 also has secured thereto a drive sprocket 44 which receives a drive chain 45 that extends through a suitable opening 46 in one wall 41 and passes over a sprocket 47 mounted on a driven shaft 48, which will be referred to later.

Means are provided to raise and lower the scoop 28 and the front end of unit 30. In this instance, a rod 49 is arranged on each side of the unit and the lower ends of these rods are bolted or otherwise secured to walls 29, as indicated at 50 (Fig. 1). The upper ends of rods 49 are pivoted to the outer ends of a pair of rocking arms 51, whose inner ends are secured to a rockshaft 52 that extends across the vehicle frame and is journaled in suitable bearings 53 secured to the upper surface of the side frame members 10. One end of shaft 52 has a gear segment 54 secured thereto and the teeth of the segment receive a worm 55 mounted in a bracket 56 secured to the adjacent frame member 10. Worm 55 has an upwardly extending handle portion 57 and it will be apparent that rotation of the worm will rock the shaft 52 and raise or lower the scoop and the front end of unit 30. Usually the scoop and unit 30 will be arranged at an angle of about 30°.

As more clearly shown in Figs. 1 and 9, shaft 48 is journaled for rotation between the side frame members 10, the ends of the shaft being received in bearings 58 bolted to members 10. Shaft 48 also has secured thereto in the channel of one of the members 10, a sprocket 59, and between sprockets 47 and 59 a large sprocket 60 is secured on this shaft. Sprocket 60 receives a drive chain 61 that passes over a drive sprocket 62 secured on a drive shaft 63 which extends into a transmission housing 64 containing the usual change speed gearing (not shown). A motor, such as an internal combustion engine (not shown), drives a belt 65 or the like, which passes over a pulley 66 secured on a shaft 67 that also extends into the transmission housing 64. A gear shift lever 68 extends from the top of housing 64 so that the speed of shaft 63 may be regulated by the change speed gearing and a complete drive will be furnished from the motor to shaft 48. Housing 64 preferably is mounted intermediate the ends of a supporting bracket 69 that extends across the vehicle frame members and is secured to the side members 10 by bolts 70 or the like. Bracket 69 and housing 64 are omitted from Fig. 2 in order not to obscure the parts thereunder.

Rearwardly of unit 30, a non-adjustable conveyor unit, indicated as a whole by numeral 71, is arranged preferably at an angle of about 45°. Unit 71 comprises a pair of spaced side walls 72 that are rigidly secured to the side frame members 10 by angle brackets 73, one pair of said brackets being secured to the side walls and the upper surface of frame members 10, while another pair of said brackets are secured to the side walls and the lower surface of frame members 10. As more clearly shown in Figs. 2 and 5, the central area of the side walls 72 extends outwardly for engagement with the brackets 73, but immediately surrounding this central area these walls are turned inwardly as at 74 (Fig. 5) and have inward extensions 75, the arrangement being such that a channel, indicated at 76 on Fig. 5, is located in the central area of each side wall. One or more tie rods 77 (Figs. 1 and 4) may be secured between the extension walls 75 to insure proper spacing between these walls. As shown in Fig. 4, rod 77 is threaded adjacent its ends to receive inner and outer nuts 78 and 79 respectively.

A grill of a width to fit between the extension walls 75 is removably fixed between these walls, as shown in Figs. 1 and 2. This grill consists of spaced longitudinal rods 80 extending at about the same angle as the side walls 72, with the lower ends of the rods being bent upwardly to not quite a right angle and being connected by a transverse rod 81. The upper ends of rods 80 are turned downwardly at about a right angle and are connected by a transverse rod 82 (see Fig. 1). The lower end of the grill is secured to the walls 75 by bolts 83 threaded through these walls into the ends of rod 81, while the upper end is similarly secured by bolts 84 threaded through these walls into the ends of rod 82.

In the lower part of unit 71, a rotatable shaft 86 is journaled between the walls 72, the ends of this shaft being received in bearings 87 secured outwardly of these walls (see Fig. 4). Shaft 86 has secured thereto a pair of spaced sprockets 88, which receive a pair of endless drive chains 89 that also pass over a pair of similar sprockets 90 that are secured on a rotatable shaft 91 journaled between the walls 75 in bearings 92 secured to the latter walls (see Figs. 1 and 13). Shaft 91 also has secured thereto a drive sprocket 93 that receives a drive chain 94 that passes over a sprocket 95 (see Figs. 1 and 6) secured on a shaft 96 journaled between one of the frame members 10 and a bearing bracket 97 extending from one of the frame members 10. Shaft 96 also has secured thereon a sprocket 98 which receives a drive chain 99 that also passes over sprocket 59 (Fig. 9), the arrangement being such that rotation of shaft 48, which carries sprocket 59, will rotate shaft 96 which in turn will rotate shaft 91 and drive the chains 89.

At spaced intervals, chains 89 have secured thereto, by means of bolts or the like 100, a plurality of transverse rods or bars 101 (see Figs. 5, 8 and 13), each bar 101 carrying a plurality of spaced fingers 102 that project outwardly so as to pass between the rods 80 during travel of the chains and fingers upwardly. As more clearly shown in Figs. 5 and 8, each bar 101 has an enlarged end portion 103 that receives a pair of parallel bolts or stub shafts 104 secured by nuts 105 in such manner that the two-part rollers 106 may freely rotate on shaft 104. During the upper run of the chains 89, the rollers 106 are guided in channel bars 107 (Fig. 5) welded or otherwise secured to the inner faces of the side walls 72.

During the lower run of the chains 89, a small amount of slack will develop in the chains, and to take up this slack a pair of idler pulleys 108 or the like are provided (see Figs. 1 and 11). These pulleys are mounted for rotation on stub shafts 109 secured in the outer ends of arms 110, the inner ends of which are secured to a shaft 111 mounted for limited turning movement between the side walls 72. Outwardly of one of the side walls 72 (see Fig. 1), a turning and locking member 112 is provided for shaft 111. Member 112 has a portion keyed or otherwise secured on the end of shaft 111, as indicated at 113, and an enlarged body portion provided with an arcuate slot 114 that receives a bolt 115 which also extends through the adjacent side wall 72 to receive a locking nut 116. By turning member 112, the shaft 111 may be turned to bring the idlers 108 into proper position to take up any slack in the chains 89, and then nut 116 may be tightened to lock the shaft and idlers in the desired position.

It is believed to be apparent that chains 89 will be rotated in a clockwise direction as viewed in Fig. 1, when power is furnished by the motor. The fingers 102 will travel with the chains and during the upper run will project between the rods 80 of the grill and carry upwardly any material that is too large to fall through the grill. Obviously, the grill may be easily removed by taking out bolts 83 and 84, and replaced by others wherein the spacing of the rods 80 may be varied as desired so that small crops such as small potatoes and the like, may be carried up the unit 71 without falling through the grill.

To the rear of the conveyor unit 71 is a shaker table unit, indicated as a whole by the numeral 117, comprising front and rear walls 118 and 119 joined together by side walls 120 having upward extensions 121, the arrangement providing a box-like structure with a plurality of spaced, longitudinal, vertically reciprocating rods 122 covering the bottom thereof except for a space at the rear through which the crops pass from the unit. Rods 122 preferably are covered with a surface of rubber 122' to cushion the shaking action on the crops. All of these walls are preferably of channel shape in cross-section.

The unit 117 is mounted so that the rear end may be raised or lowered to permit the unit to be kept substantially level when the vehicle is traveling up or down hill, and it is also mounted for tilting to either side whereby it may be kept substantially level when the vehicle is operating on the side of a hill. As more clearly shown in Figs. 1, 6 and 7, a shaft 123 is mounted in brackets 124 secured to the lower faces of the frame members 10, and centrally of this shaft, a vertical bracket 125 is mounted for limited turning movement. Bracket 125 is restrained from moving axially of shaft 123 by screws or the like 126 extending into suitable grooves 127 (Fig. 7) formed in the shaft, which arrangement does not interfere with the limited turning movement of the bracket.

The upper end of bracket 125 is bored longitudinally of the vehicle to receive a short pin or shaft 128 extending forwardly from and preferably formed integral with a bearing bracket 129 secured to the front wall 118 of the box-like structure, as by means of bolts 130. A cotter pin 131 or the like extends through the end of shaft 128 to prevent it slipping out of bracket 125. The rear wall 119 of the box-like structure is provided centrally with an opening that receives a small pin or shaft 132 extending forwardly from and preferably formed integral with a vertical, tubular rod 133, which rod receives the vertical arm 134 of a T-shaped guiding member 135, the horizontal arms 135' of which have their ends secured in brackets 136 carried by two of the posts 18 (Figs. 1 and 3). As more clearly shown in Fig. 3, pins 137 pass through brackets 136 and the horizontal arms 135', providing a mounting which permits member 135 to have slight vertical movement in the brackets 136. Suitable cotter pins or the like are provided for the ends of shaft 132 and pins 137.

The rear face of wall 119 (see Fig. 3) has bolted or otherwise secured thereto, a semi-circular arm 138 provided with a plurality of spaced notches 139 in its central portion, which notches are adapted to receive the bifurcated lower end of a spring-pressed locking pin 140 mounted for vertical movement in a sleeve 141 carried by and preferably formed integral with rod 133. Near its upper end, rod 133 is provided with a forwardly extending pin 141' which pivotally receives the lower end of a lever arm 142, the upper end of which is pivoted as at 143 to an extension 144 formed intermediate the ends of a handle member 145, one end of which is pivoted as at 146 to a bracket 147 carried by one of the posts 18. The other end of member 145 passes around a ratchet member 146' secured outwardly of one of the posts 18, and has pivoted thereto at 147' a spring-pressed hand-gripping portion 148 having a pawl or dog 149 that engages the teeth of the ratchet 146' to hold the member 145 in any desired position.

It is believed to be apparent that to raise or lower the rear end of unit 117 it is only necessary to press the hand-grip 148 and move member 145 about its pivot 146. This action will raise or lower, depending upon the direction of movement of member 145, the lever 142 and the rod 133, which will be guided in its movement by arm 134 extending thereinto. Pin or shaft 132 will be moved with rod 133 and the entire unit 117 will turn on the shaft 123. Release of the hand-grip 148 will then hold member 145 and unit 117 in the desired position. It will be noted that with the pivotal connection between member 145 and lever 142, and the similar connection between the latter lever and rod 133, the latter rod will move substantially vertically, but if there should be a slight tendency for rod 133 to pivot with shaft 132, the loose mounting of the T-shaped member 135 will accommodate such movement without jamming the arm 134 in rod 133.

Since the shafts 128 and 132 are in substantially the same horizontal plane, they readily permit tilting of the unit 117 to either side of its longitudinal axis. This tilting is accomplished by first lifting the locking pin 140 by its handle portion to release it from engagement in the notches 139 of the semicircular arm 138. After this release, unit 117 may be manually tilted to either side and upon reaching the desired position, the spring-pressed pin 140 may be snapped into whichever notch 139 happens to be under it, to hold the unit in its desired position.

Means are provided to reciprocate the rods 122, and since these rods and the shafts to which they are connected are part of unit 117, they must tilt or move up and down with the box-like structure, so that a special universal connection is provided in the drive means which permits the latter to function regardless of the position of the box-like structure. As more clearly shown in Figs. 7 and 14, rods 122 are connected inwardly of their rear ends by hinges 150 to crank arms 151 eccentrically mounted on a crank shaft 152 which is journaled for rotation in bearings 153 carried in the lower ends of slightly elongated brackets 154 secured to the lower face of side walls 120. Near one end of shaft 152, a sprocket 155 is secured thereon, which sprocket receives a drive chain 156 that also passes around a sprocket 157 (Figs. 7 and 12) secured on a rotatable shaft 158 near one end of the latter. Shaft 158 is journaled in bearings 159 secured to the lower face of side walls 120 and carries a plurality of crank arms 160 that are also eccentrically mounted. The front ends of rods 122 are secured directly to the upper faces of the crank arms 160 and no hinges are used in making this connection. Shaft 152 is preferably lower than shaft 158 and the bearings for shaft 152 are consequently placed in the lower end of bracket 154.

Rotation of shaft 158 will rotate shaft 152, and the crank arms 160 and 151 will cause the bars 122 to reciprocate, the arrangement being such that the throw of shaft 158 is about twice that of shaft 152, which will cause the crops in the box-like structure to move rearwardly while they are being vigorously shaken to remove dirt therefrom. As indicated in Fig. 7, the bars 122 alternate in their movements. For example the first, third, fifth, etc. will be moving up while the second, fourth, sixth, etc. will be moving down, and vice versa, thus providing a substantial shaking action.

Approximately centrally of shaft 158, a sprocket 161 (Fig. 12) is secured thereon and the hub of this sprocket is provided with an integral bearing 162 for the shaft, carried in the lower end of an angular bracket 162' which is secured at its upper end to the front wall 118 (Figs. 7 and 12). A drive chain 163 passes over sprocket 161 and around a sprocket 164 (Fig. 7) secured on a shaft 165 journaled at one end in a bracket 166 (Figs. 6 and 15), secured to bracket 129. The other end of shaft 165 is connected to a universal joint 167 (Figs. 6 and 15) which in turn is connected by a short shaft 168 to a second universal joint 169 that has one end of shaft 96 connected thereto. Thus, rotation of shaft 96 through its drive connections to the motor will operate the shaker bars 122, and even though the unit 117 is in a tilted or a raised or lowered position, the universal joints allow sufficient flexibility to the drive so that the latter continues to function.

Referring to Figs. 12 and 14, it will be noted that the two middle bars 122 are widened at their upper ends as at 170, so as to nearly cover the space occupied by the sprocket 161 and bearing 162 to prevent crops becoming lodged in this space. Also it will be observed from Fig. 7 that an inclined guard 171 is secured to the upper face of the front wall 118 and forms a cover over the crank shaft 158 and the operating members secured thereto, so that dirt from the crops will not be shaken directly onto the covered parts.

Beneath the rear end of unit 117, an open hopper, indicated as a whole by the numeral 172, is arranged to receive crops which pass over the rear ends of the bars 122. Hopper 172 comprises front and side walls 173 and 174 respectively, suitably secured to an inclined bottom 175 preferably formed of spaced slats or the like. The front ends of these slats are secured to a cross bar 176 extending transversely of the vehicle along the front wall 173. A bracket arm 177 partially obscures the slats 175 in Figs. 1 and 16 since it is in the same plane as these slats. Intermediate their ends, the bottom slats are also secured to a short cross bar 178, but no other cross bars are used, so that the ends of the slats may extend to the rear of and pass through the spaces between the slats of a movable gate, indicated as a whole by the numeral 179, which closes the rear end of the hopper. As will be observed in Fig. 2, the rear portions of the side walls 174 of the hopper converge inwardly to reduce the size of the rear opening of the hopper.

The gate 179 comprises a lower transverse bar 180, to which the upwardly extending spaced slats 181 are suitably secured. As more clearly shown in Figs. 3 and 10, bar 180 has end portions which do not carry any slats and which extend adjacent the rear posts 21. Each end of bar 180 has a forwardly extending arm 182 (see Figs. 1, 2 and 16) secured thereto and the front end of each arm 182 is pivoted on a pin or small shaft 183 which is mounted in a bracket 184 carried by adjacent posts 21. Also at its ends, the upper surface of bar 180 has pivoted thereto the lower ends of a pair of operating rods 185, the upper ends of which extend forwardly at approximately a right angle, as indicated at 186 (Figs. 1 and 16), and pivotally engage a pin 187 (Figs. 1, 3, 10 and 16). Pins 187 also have pivoted thereto one end of a short link 188, the opposite ends of which are fixedly secured to a transverse shaft 189 mounted for turning movement in bearings 190, carried by the rear posts 18. The ends of shaft 189 are provided with handles 191.

Figs. 1, 2, 3 and 16 show the gate 179 in closed position with the slats thereof extending between the slats of the inclined bottom of the hopper (see Fig. 3). In this closed position, the handles 191 extend forwardly and the links 188 incline forwardly, so that the pins 187 are past the center of shaft 189 toward the left as viewed in Figs. 1 and 16. This past center arrangement will hold the gate in closed position. To open the gate to the position shown in Fig. 10 and in the broken line position of Fig. 16, either of the handles 191 are turned in a clockwise direction as viewed in Figs. 1 and 16. This action turns the shaft 189 and the links 188 in the same direction, and as soon as pins 187 pass the center of shaft 189, the weight of the gate and the parts secured thereto will cause the gate to drop by the force of gravity to its open position. In this open position, the links 188 and rods 185 assume the position shown in Fig. 10, from which position the gate may be quickly closed by reversing the movement, which may be done by turning either of the handles 191 in the opposite direction.

The past center feature of the gate operation provides an arrangement which can be operated so quickly that crops will not clog the opening. This is very desirable when it becomes necessary to shut off the passage of crops from the hopper after a crate is filled. It should be noted that the movement of the gate is not a true vertical movement, but is in a slightly arcuate path, due to the turning action of arms 182 on the pins or shafts 183. The extent of movement of arms 182 is indicated in broken lines in Fig. 16, and the movement of handles 191 is also shown in broken lines in this figure.

On the rear of the vehicle a crate elevator is mounted and is indicated as a whole by the numeral 192 (see Figs. 3 and 10). This elevator comprises upper and lower cross frame members 193 and 194 respectively, connected by vertical side members 195. Secured to the rear faces of frame members 193 and 194, as indicated at 196, is a pair of vertical, parallel posts 197 that extend below the member 194 and carry on their lower ends, horizontal crate supporting rods 198, preferably welded or otherwise rigidly secured to the posts. As best shown in Figs. 1 and 16, rods 198 are secured intermediate their ends to posts 197, and have a portion that extends rearwardly to receive one of the crates 199, while a forwardly extending portion is turned upwardly as at 200. These upwardly turned portions prevent rods 198 being entangled in weeds or the like while the vehicle is moving particularly when in their lower position, indicated in broken lines in Figs. 1 and 16. The front faces of frame members 193 and 194 have annular sleeves 201, formed integral with or otherwise secured thereto, which sleeves are slidably mounted on guide posts 202 rigidly secured, as by welding, to rearward extensions 203, the lower of which are formed on the rear cross member 22, while the upper are formed on the rear frame member 11.

Means are provided for raising and lowering the crate elevator 192. Fig. 3 shows the raised position and Fig. 10 the lowered position of this elevator. Secured to the upper member 193 near the ends thereof are the lower ends of a pair of cables 204 which wrap around a roller 205 and have their ends secured thereto at 206. Roller 205 is mounted for rotation in bearing brackets 207 secured on the rear posts 18, and the lower end of a cable 208 wraps around and is also secured to this roller at 209, but the wrapping is opposite to that of cables 204. Cable 208 extends upwardly from the roller and passes over an angularly mounted pulley 210 carried in a bracket 211 secured to one of the rear posts 18. The other end of cable 208 is secured to one end of a coil spring 212, the opposite end of which is secured to bracket 213 carried by the other rear post 18. The arrangement is such that spring 212 has a normal bias tending to hold the crate elevator in its raised position through the action of the cables 204 and 208, unless and until there is sufficient weight on the elevator to overcome the force of the spring.

When the elevator is moved down (Fig. 10), cables 204 will partially unwind from and turn the roller as they move downwardly, while cable 208 will wind around the roller as it turns and stretch spring 212, as will be understood. Thus, at any time the weight holding the elevator down is removed, spring 212 will instantly pull cable 208, which action will turn the roller in the opposite direction and wind up the cables 204 to raise the elevator. When the upper sleeves 201 reach the upper ends of the guide posts 202, as in Fig. 3, there can be no further upward movement.

Means are provided to prevent the elevator from moving downward due to the presence of weight thereon, such as a full crate of crops, until the operator desires this movement. As more clearly shown in Figs. 1 and 16, on the front faces of the vertical frame members 195, a small lug 214 is mounted intermediate the ends of these members. Substantially L-shaped stop arms 215 have their upper ends secured to a rock shaft 216 journaled in bearings 217 carried by the rear posts 21, and the lower or short legs of these stop arms are adapted to extend under lugs 214 and prevent downward movement of the elevator until removed from the path of the lugs.

Two ways are shown for rocking shaft 216 to move the stop arms from the path of the lugs, one operated manually and the other automatically as the gate 179 swings to closed position. As best shown in Figs. 1 and 16, shaft 216 has an operating arm 218 secured on one end thereof intermediate the ends of the arms. The forward end of arm 218 has one end of a small coil spring 219 secured thereto, the opposite end of said spring being secured to bracket 177, while the other end of this arm extends rearwardly to provide a handle. Spring 219 has a normal bias tending to keep the operating arm in the full line position shown in Figs. 1 and 16, in which position the stop arms 215 prevent downward movement of the elevator. By moving arms 218 manually downwardly to the broken line position in Figs. 1 and 16, the stop arms 215 swing forwardly to the broken line position and out of the path of travel of the lugs, so that if sufficient weight is on the elevator, it will move downwardly. Upon its release, arm 218 will return to its upper position by the action of spring 219, and the rear frame member 11 acts as a stop member to prevent this arm going beyond the position shown. An inclined surface 221 on the face of lugs 214 is provided so that when the elevator again moves upwardly, these surfaces will engage the stop arms 215 and move them out of the way. After the elevator reaches its upper position, spring 219 moves the stop arms back into proper position to prevent lowering of the elevator.

Pivoted to operating arm 218, between shaft 216 and spring 219, is the upper end of a lever 218', the lower end of which is pivoted to an arm 222, which in turn is pivoted to a bracket 223 mounted on one of the rear posts 21. Arm 222 preferably is L-shaped in cross-section and near its free end pivotally carries a small dog 224, shaped like an inverted T, the arrangement being such that the dog may pivot in a counter-clockwise direction relative to the arm but cannot pivot in a clockwise direction beyond the position indicated in Figs. 1 and 16. A spring 225 returns the dog to its position in Figs. 1 and 16, after any counter-clockwise movement.

One of the gate arms 182 carries an operating finger 226 which moves in a path occupied by the dog 224. When the arms 182 swing downwardly during the opening of gate 179, finger 226 will strike the dog 224, moving it counter-clockwise and passing on. Dog 224 will return to its starting position and no movement will be imparted to arm 222. During upward movement of the arms 182, however, finger 226 will again strike dog 224, but since the latter cannot pivot in a clockwise direction from its normal position, finger 226 will move arm 222 upwardly, which will in turn push lever 218' upwardly and move the operating arm 218 to its broken line position, thus automatically rocking shaft 216 and moving the stop arms 215 from beneath the lugs 214, so that the elevator may drop.

In normal operation, after a crate becomes filled with crops, it is desirable to close the gate and prevent any more crops leaving the hopper until another empty crate is placed in position. Thus, during the closing movement of the gate the elevator with the filled crate is automatically lowered to a position where the rods 198 will sink into the ground a sufficient distance to permit the filled crate to touch the ground and be left there as the machine continues, from where the crate may be picked up later. As soon as the filled crate is dropped, the weight is removed from the elevator, and it automatically rises. If it should become desirable to lower the elevator while the gate remains open, this can be done by manually depressing arm 218.

At times it might be desirable to keep the elevator in raised position while the gate is being closed, particularly during turning of the machine. This is accomplished by a stop pin 227 mounted for turning movement in a bracket 228 secured to the rear face of the rear frame member 11. Pin 227 has an upper handle portion 229 and a lower projecting portion 230, which can be turned at a right angle from the position shown in Fig. 10 to the position shown in Fig. 3 where portion 230 extends under frame member 193 and prevents the elevator moving down while the projection is in its path.

Extending inwardly from the rear ends of the running boards 25 are crate guiding and holding members 231, which may be adjusted so that crates of different sizes may be carried on rods 198 and held by members 231 against displacement to the side. As shown (Figs. 3 and 10), members 231 are provided with a plurality of openings 232, any one of which may be alined with an opening 233 in the end of the running boards. Bolts 234 extend through these alined openings and after tightening will hold members 231 in any selected position.

All of the cross members 20 at the top of the vehicle are formed as shown in Fig. 3. In Fig. 1, only two of the members 20 are shown, but it will be understood that at least one additional member is used near the front of the vehicle. Referring to Fig. 3, members 20 have upwardly directed sides 236 and 237. From the top of side 236 the members incline downwardly as at 238, then upwardly as at 239, then they run horizontally as at 240, then downwardly as at 241, then upwardly as at 242, then horizontally as at 243, then downwardly as at 244, and then upwardly as at 246 to join the top of side 237. Longitudinally of the vehicle, the members 20 are connected by guide rails 246. In Fig. 3, only four of these rails are visible, but it will be understood that there is a side rail on each side (Fig. 1) in addition to the four shown. The arrangement provides a plurality of trough-like compartments which will hold a plurality of inclined empty crates in each compartment, the arrangement being such that the crates in one compartment do not interfere with the movement of those in any other compartment.

Brackets 247 (Fig. 1) extend rearwardly of the vehicle from the rear posts 18 at points below their upper ends and are connected by a transverse bar 248. Inclined downwardly and inwardly from the rear member 20 is a pair of side rails 249, suitably secured at their upper ends near the top of sides 236 and 237 and at their lower ends to bar 248. Intermediate the side rails 249, a plurality of guide rails 250, in this instance three, incline downwardly from the base of the rear member 20 to the bar 248. This arrangement provides a cage-like structure that will hold two of the empty crates 199 that have been pushed into it from any of the crate carrying compartments. If necessary, a single empty crate may be given a push sufficient to travel from the front of the vehicle along its guide rails and into the cage. Where more than one empty crate is in a compartment, the front crate may be easily pushed until the rear crate drops into the cage. Thus, an operator riding on a running board at the rear of the vehicle need only reach up into the cage to get an empty crate to place in position to receive crops from the hopper. An operator along the side of the vehicle can easily push another empty crate into the cage when the latter is empty.

Suitable hand rails 251 (Fig. 1) may be extended along the sides of the vehicle to be grasped by an operator standing on the running boards.

In operation, the harvester will approach buried crops, such as a furrow of potatoes or the like, with the upper frame 19 filled with empty crates and with one empty crate on the elevator, if desired, in position to receive crops from the hopper when the gate is open. Also, empty crates may be placed on the horizontal boards 26 to receive stones or the like, picked out by the operators. Only two operators are required, one on a front running board, and one at the rear, although more can be used if desired. The motor is started and the scoop 28 adjusted to the desired height. The scoop will dig into the furrow and crops, stones, weeds, dirt, etc., will pass into the small conveyor 30 and be carried upwardly to the top thereof. It will be noted that with the brackets 37 having bearings 36 that receive the bearings 35 for the shaft 34, the rearward thrust from the action of the scoop is not taken directly on the shaft 34, but is absorbed by the brackets 37 and the main frame to which they are secured.

The crops and foreign material fall from the top of unit 30 onto the bottom of the grill in the conveyor unit 71, and are conveyed by the fingers 102 to the top of the latter unit. Much of the dirt and small stones will fall through the grill during travel in unit 71. Weeds may be taken out and thrown aside by the operators, and large stones may be taken out and placed in a crate carried on one of the horizontal boards 26, so that these stones can be permanently removed from the field in which the machine is operating.

By the time the crops reach the top of unit 71, practically all of the foreign matter will have been picked out by the operators, except dirt that is clinging to the crops. Upon delivery to the shaker table 117 the crops are subjected to a vigorous shaking action which will remove most, if not all, of the dirt clinging thereto. Most of the dirt will be shaken off near the front end of the shaker table and will fall through the spaces between the bars 122. Thus, substantially clean crops will pass over the rear ends of rods 122 into hopper 172.

The gate is preferably open so that the crops will pass through the hopper and into the crate. When the crate is full the gate is closed, permitting the hopper to momentarily hold the crops, and the elevator carrying the crate will automatically drop, so that the filled crate may slide off onto the ground. After the filled crate is removed, the elevator immediately raises into position to receive another empty crate, which may be filled and removed in the same manner.

While I have illustrated and described the preferred form of the invention, it will be understood that changes and modifications may be made therein without departing from the spirit of the invention or from the scope of the subjoined claims.

What is claimed is:

1. In a harvester for crops, the combination with a wheeled vehicle of a hopper on said vehicle for said crops, a gate for said hopper movable upwardly to closed position and downwardly to open position, and means for operating said gate comprising a vertical rod having its lower end pivoted to said gate and its upper end turned at an angle, a shaft arranged transversely of said rod below the upper end thereof, a link having its lower end fixed to said shaft and its upper end pivoted to the upper end of said rod, and means for turning said shaft whereby when the pivotal point of said link and said rod passes the center of said shaft in one direction, the gate drops quickly by the force of gravity, and when said point passes the center of said shaft in the other direction, the gate is held in closed position by the force of gravity.

2. In apparatus for harvesting crops, the combination with a wheeled vehicle of a hopper adapted to receive said crops, a crate elevator mounted for vertical movement at the rear of the vehicle, a gate for said hopper through which said crops pass into a crate on said elevator, a projecting lug on said elevator, a locking member in the path of said lug, and means operable by closing said gate to move said locking member out of the path of said lug.

3. In apparatus for harvesting crops, the combination with a wheeled vehicle of a hopper adapted to receive said crops, a crate elevator mounted for vertical movement at the rear of the vehicle, a gate for said hopper through which said crops pass into a crate on said elevator, a pair of projecting lugs on said elevator, a shaft extending transversely of the vehicle, a pair of locking members having one end secured to said shaft and the other extending beneath said lugs, and a spring-pressed lever to turn said shaft to move said locking members from beneath said lugs, said lever being automatically operable by closing said gate.

4. In a harvester for crops, the combination with a wheeled vehicle of a hopper for said crops, a gate on said hopper movable upwardly to closed position and downwardly to open position, a vertically movable crate elevator adapted to carry a crate to receive crops passing from the hopper through said gate, said elevator being movable downwardly by the weight of a full crate, means for holding the elevator in raised position until the crate is filled with crops including a lug on said elevator and a pivoted locking member arranged beneath said lug, and means operable by closing said gate to pivot said locking member from beneath said lug to allow the elevator to move downwardly.

5. A harvester of the character referred to in claim 4 wherein said last named means comprises a spring-pressed lever to which said locking member is secured, a second lever having its upper end secured to said first lever, an arm pivoted on the frame of said vehicle, the lower end of said second lever being pivoted to said arm, and an operating finger on said gate arranged to engage said arm to move it and said second lever upwardly when the gate moves upwardly.

6. A harvester of the character referred to in claim 4 wherein said last named means comprises a spring-pressed lever to which said locking member is secured, a second lever having its upper end secured to said first lever, an arm pivoted on the frame of said vehicle, the lower end of said second lever being pivoted to said arm, an operating finger on said gate arranged to engage said arm to move it and said second lever upwardly when the gate moves upwardly, and means on said arm to allow said finger to pass when the gate moves downwardly.

7. In a harvester for crops, the combination with a wheeled vehicle of a combined scoop and adjustable conveyor, a stationary conveyor rearwardly of said first conveyor, a box-like shaker table including a plurality of vertically reciprocating shaker rods rearwardly of said stationary conveyor, and means for operating said conveyors and reciprocating said shaker rods from a common source comprising driving connections from said source to a master shaft, driving connections from said shaft to said first conveyor, driving connections from said shaft to said second conveyor and driving connections from said second conveyor to said shaker rods.

8. A harvester of the character referred to in claim 7 wherein said shaker table and rods are tiltable so as to keep the rods substantially level when the vehicle is operating on the side of a hill, and the driving connections for said rods are flexible so as not to affect the operation of said rods in a tilted position.

9. A harvester for the character referred to in claim 7 wherein said shaker table and rods are tiltable so as to keep the rods substantially level when the vehicle is operating on the side of a hill, and the driving connections for said rods include at least two universal joints.

10. In a harvester for crops, the combination with a wheeled vehicle of a crate elevator mounted for vertical movement at the rear of the vehicle, said vehicle having means slidably receiving said elevator, means tending to hold the elevator in raised position, said elevator being movable downwardly by weight placed thereon sufficient to overcome the force of said last named means, a pair of projecting lugs on said elevator, a shaft extending transversely of the vehicle, a pair of locking members having one end secured to said shaft and the other extending beneath said lugs, and a spring-pressed operating lever to turn said shaft to move said locking members from beneath said lugs.

11. In a harvester for crops, the combination with a wheeled vehicle of a crate elevator mounted for vertical movement at the rear of the vehicle, said vehicle having means slidably receiving said elevator and means tending to hold the elevator in raised position, said elevator being movable downwardly by weight placed thereon sufficient to overcome the force of said last named means, said last named means comprising a pair of cables connected at one end to said elevator, a roller, the other end of said cables being secured to said roller, an additional cable having one end secured to said roller, and a spring secured to the other end of said last named cable, said spring having a normal bias to pull said last named cable.

12. A harvester of the character referred to in claim 7 wherein one end of said shaker table and rods may be raised or lowered so as to maintain the table and rods substantially level when the vehicle is operating up and down hill, and the driving connections for said rods are flexible so as not to affect the reciprocation of said rods during such operation of the vehicle.

13. In apparatus for harvesting buried crops, the combination with a wheeled vehicle of means for digging the crops from the ground, means on said vehicle for shaking the crops to separate dirt and other foreign matter therefrom, means on said vehicle for conveying the crops from said digging means to said shaking means, said conveying means including inclined side walls, a removable grill consisting of spaced longitudinal rods secured to said side walls and a plurality of upwardly projecting fingers extending between said rods, a hopper adapted to receive said crops from said shaking means, a movable crate carrying member, a gate for said hopper through which said crops pass into a crate on said member, and means operable by closing said gate to automatically lower said crate carrying member and crate when the latter is filled with crops.

14. In a harvester for crops, the combination with a wheeled vehicle of a crate elevator mounted for vertical movement at the rear of the vehicle, said vehicle having means slidably receiving said elevator and means tending to hold the elevator in raised position, said elevator being movable downwardly by weight placed thereon sufficient to overcome the force of said last named means, said elevator being provided with a projecting lug, a locking member in the path of said lug, and means for moving said locking member out of said path after sufficient weight has been placed on said elevator to move it downwardly.

15. In a harvester for crops, the combination with a wheeled vehicle of a crate elevator mounted for vertical movement at the rear of the vehicle, said vehicle having means slidably receiving said elevator and means tending to hold the elevator in raised position, said elevator being movable downwardly by weight placed thereon sufficient to overcome the force of said last named means, said elevator having a plurality of horizontal crate holding rods on its lower end, the front ends of said rods being turned upwardly to prevent entanglement with weeds when said elevator is in its downward position.

CLAIR R. JOHNSTON.

REFERENCES CITED

The following references are of record in the file of this patent:

UNITED STATES PATENTS

| Number | Name | Date |
|---|---|---|
| 171,224 | Heydemann | Dec. 21, 1875 |
| 609,289 | Moulton | Aug. 16, 1898 |
| 612,439 | Schoenefeldt | Oct. 18, 1898 |
| 616,885 | Brennan | Jan. 3, 1899 |
| 640,754 | Denis | Jan. 9, 1900 |
| 648,133 | Reuther | Apr. 24, 1900 |
| 706,981 | Massey | Aug. 12, 1902 |
| 810,922 | Dickey | Jan. 30, 1906 |
| 1,269,342 | Wabers | June 11, 1918 |
| 1,301,109 | Davis | Apr. 22, 1919 |
| 1,427,145 | Yantz | Aug. 29, 1922 |
| 1,519,289 | Allen | Dec. 6, 1924 |
| 1,562,929 | Trovaton | Nov. 24, 1925 |
| 1,573,998 | Ribbans | Feb. 23, 1926 |
| 1,583,035 | Valerius | May 4, 1926 |
| 1,723,591 | Watkins | Aug. 6, 1929 |
| 1,733,533 | Fountaine | Oct. 29, 1929 |
| 1,816,999 | Ensminger | Aug. 4, 1931 |
| 1,984,826 | Bunker | Dec. 18, 1934 |
| 2,107,640 | Magnuson | Feb. 8, 1938 |
| 2,209,282 | Rodin | July 23, 1940 |
| 2,230,139 | Gustin | Jan. 28, 1941 |

FOREIGN PATENTS

| Number | Country | Date |
|---|---|---|
| 49,173 | Germany | Oct. 17, 1889 |
| 11,353 | Great Britain | 1906 |
| 228,057 | Germany | Nov. 1, 1910 |
| 23,098 | Denmark | May 13, 1918 |